(12) United States Patent
Ishida

(10) Patent No.: US 6,611,124 B2
(45) Date of Patent: Aug. 26, 2003

(54) CONTROL APPARATUS OF INDUCTION MOTOR

(75) Inventor: Seiji Ishida, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,676

(22) Filed: Feb. 26, 2001

(65) Prior Publication Data
US 2001/0026140 A1 Oct. 4, 2001

(30) Foreign Application Priority Data
Feb. 29, 2000 (JP) .................... 2000-054207

(51) Int. Cl.$^7$ .............. H02P 5/28; H02P 7/42; H02P 5/34
(52) U.S. Cl. .............. 318/727; 318/767; 318/800; 318/801; 318/805; 318/807; 318/808; 318/812
(58) Field of Search .............. 318/727, 818, 318/820–823, 825–828, 767, 800–811, 812

(56) References Cited

U.S. PATENT DOCUMENTS

| | | | | |
|---|---|---|---|---|
| 4,792,742 A | * | 12/1988 | Fujimoto et al. | 318/800 |
| 5,264,773 A | * | 11/1993 | Koyama et al. | 318/798 |
| 5,495,158 A | * | 2/1996 | Schmidt et al. | 318/561 |
| 5,598,081 A | * | 1/1997 | Okamura et al. | 318/52 |
| 5,629,597 A | * | 5/1997 | Imanaka | 318/805 |

FOREIGN PATENT DOCUMENTS

| | | | |
|---|---|---|---|
| GB | 2 290 888 | 1/1996 | G01R/19/00 |
| JP | 6-105580 | 4/1994 | |
| JP | 6-265607 | 9/1994 | |
| JP | 6-284511 | 10/1994 | |
| JP | 6-284771 | 10/1994 | |
| JP | 6-335278 | 12/1994 | |
| JP | 7-231700 | 8/1995 | |
| JP | 8-80100 | 3/1996 | |
| JP | 8-126388 | 5/1996 | |
| JP | 8-317698 | 11/1996 | |
| JP | 9-182499 | 7/1997 | |
| JP | 9-191699 | 7/1997 | |

* cited by examiner

Primary Examiner—Robert E. Nappi
Assistant Examiner—Patrick Miller
(74) Attorney, Agent, or Firm—Antonelli, Terry, Stout & Kraus, LLP

(57) ABSTRACT

An induction motor control apparatus includes a first constant correction unit for correcting primary resistance based on quantity obtained by multiplying quantity of a voltage command from a frequency voltage control unit by the output of a correction unit, the quantity of the voltage command being a result of partial differentiation with the primary resistance; a second constant correction unit for correcting the inductance based on quantity obtained by multiplying quantity of the voltage command, the quantity of the voltage command being a result of partial differentiation with the inductance; and a third constant correction unit for correcting the inductance ratio based on quantity obtained by multiplying quantity of the voltage command, the quantity of the voltage command being a result of partial differentiation with the inductance ratio, suppressing the deterioration of control performance caused by the setting errors.

5 Claims, 7 Drawing Sheets

CONTROL APPARATUS OF INDUCTION MOTOR

BACKGROUND OF THE INVENTION

1. Field of the Invention

The present invention relates to a control apparatus for an AC motor, and more particularly, it relates to a technology for estimating a constant of the AC motor.

2. Description of the Related Art

Heretofore, as a control apparatus for an AC motor, to which a control method is applied, there has been available a control apparatus having such a constitution as shown in FIG. 3. In FIG. 3, a reference numeral 1 denotes an AC power source; 2 a converter; 3 a smoothing capacitor; 4 an inverter; 5 a current detector; 6 an induction motor; 11 a speed control unit; 12a a voltage operation unit; 13 a voltage conversion unit; 14 a q-axis current control unit; 15 a d-axis current control unit; 16 a correction voltage operation unit; 17 a d-axis secondary magnetic flux command unit; 18a a frequency operation unit; 19 an integrator; 20 a current conversion unit; and 21a a speed estimation unit.

An AC voltage outputted from the AC power source 1 is rectified by the converter 2, and smoothed by the smoothing capacitor 3 to be converted into a DC voltage. The DC voltage thus obtained by the conversion is converted into an AC voltage by the inverter 4 in accordance with a U-phase voltage command Vu*, a V-phase voltage command Vv* and a W-phase voltage command Vw*, which are all outputs from the voltage conversion unit 13. Then, the induction motor 6 is driven. A U-phase current Iu and a W-phase current Iw flowing through the induction motor 6 are detected by the current detector 5. The detected currents Iu and Iw are subjected to rotational coordinate transformation at the current conversion unit 20 based on a phase θ, which is an output from the integrator 19, and then converted into a d-shaft current Id and a q-axis current Iq as the components of a dq rotational coordinate system.

On the other hand, the speed control unit 11 controls a q-axis current command Iq* in such a way as to cause an estimated speed ωr^ outputted from the speed estimation unit 21a to coincide with a speed command ωr* provided from an external unit. At the q-axis current control unit 14, a q-axis current control quantity ΔVqo is outputted based on an expression (1) using a q-axis current command Iq* and a q-axis current Iq outputted from the speed control unit 11. In the expression (1) below, Kpcq and Kicq represent control gains, and s represents a differential operator.

$$\Delta Vq0 = \left( Kpcq + \frac{Kicq}{s} \right) \cdot (Iq^* - 0q) \tag{1}$$

At the d-axis current control unit 15, a d-axis current control quantity ΔVd0 is outputted based on an expression (2) using a d-axis current command Id* and a d-axis current Id provided from the external unit. In the expression (2) below, Kpcd and Kicd represent control gains.

$$\Delta Vd0 = \left( Kpcd + \frac{Kicd}{s} \right) \cdot (Id^* - Id) \tag{2}$$

At the correction voltage operation unit 16, a d-axis voltage correction quantity ΔVd and a q-axis voltage correction quantity ΔVq are computed based on an expression (3) using the d-axis current control quantity ΔVd0 and the q-axis current control quantity ΔVq0. In the expression (3) below, Kd and Kq represent control gains.

$$\begin{pmatrix} \Delta Vd \\ \Delta Vq \end{pmatrix} = \begin{pmatrix} Kd & 0 \\ Kq & 1 \end{pmatrix} \cdot \begin{pmatrix} \Delta Vd0 \\ \Delta Vq0 \end{pmatrix} \tag{3}$$

At the voltage operation unit 12a, d-axis and q-axis voltage commands Vd* and Vq* as voltage commands in the dq rotational coordinate system are computed based on an expression (4) using the d-axis current command Id*, the q-axis current command Iq*, a d-axis secondary magnetic flux command φd* outputted from the d-axis secondary magnetic flux command unit 17, a frequency command value ω1* outputted from the frequency operation unit 18, the d-axis voltage correction quantity ΔVd and the q-axis voltage correction quantity ΔVq. In the expression (4), R1* represents a primary resistance set value; Lσ* a leakage inductance set value converted to the primary side; and Km an inductance ratio calculated from mutual inductance M* and secondary inductance L2* based on an expression (5).

$$\begin{pmatrix} Vd^* \\ Vq^* \end{pmatrix} = \begin{pmatrix} R1^* & \omega 1^* \cdot L\sigma^* \\ \omega 1^* \cdot L\sigma^* & R1^* \end{pmatrix} \cdot \begin{pmatrix} Id^* \\ Iq^* \end{pmatrix} + \begin{pmatrix} 0 \\ \omega 1^* \cdot Km^* \cdot \phi d^* \end{pmatrix} + \begin{pmatrix} \Delta Vd \\ \Delta Vq \end{pmatrix} \tag{4}$$

$$Km^* = \frac{M^*}{L2^*} \tag{5}$$

The d-axis and q-axis voltage commands Vd* and Vq* computed at the voltage operation unit 12a are subjected to transformation from a q-axis rotational coordinate axis to a fixed coordinate axis by the voltage conversion unit 13 based on a phase θ outputted from the integrator 19, and converted into a U-phase voltage command Vu*, a V-phase voltage command Vv*, and a W-phase voltage command Vw*. Then, voltage control is carried out.

A d-axis secondary magnetic flux command φd* is computed from the d-axis current command Id* at the d-axis secondary magnetic flux command unit 17 based on an expression (6).

$$\phi d^* = M^* \cdot Id^* \tag{6}$$

At the frequency control unit 18, a frequency command value ω1* is computed based on an expression (7) using the q-axis current command Id*, the d-axis secondary magnetic flux command φd*, and a speed estimated value ωr^ outputted from the speed estimation unit 21a. In the expression (7) below, R2* represents a secondary resistance set value.

$$\omega 1^* = \omega r^\wedge + \frac{R2^* \cdot Km^* \cdot Iq^*}{\phi d^*} \tag{7}$$

At the integrator 19, a phase θ is calculated by integrating the frequency command value ω1*.

Furthermore, at the speed estimation unit 21a, a speed estimated value ωr^ is computed based on an expression (8) using the q-axis current Iq and the d-axis secondary magnetic flux command φd*. In the expression (8) below, T1 represents a control constant used to decide estimation response.

$$\omega r^{\wedge} = \frac{1}{1+T1 \cdot s} \times \frac{1}{Km^* \cdot \phi d^*} \times \{Km^* \cdot \phi d^* \cdot \omega I^* + \quad (8)$$
$$R1^* \cdot Iq^* - (R1^* + Km^{*2 \cdot R2^*} + L\sigma^* \cdot s) \cdot$$
$$Iq + \Delta Vq0\}$$

According to the control system conFIG.ured in the foregoing manner, as long as there is coincidence between a motor constant used for the primary resistance of the induction motor 6 and a motor constant used for the voltage operation unit 12a, the frequency operation unit 18a and the speed estimation unit 21a, then the secondary magnetic flux of the induction motor 6 is controlled to be constant, and the q-axis current Iq is set proportional to torque. Accordingly, a good control characteristic can be obtained.

As such a control method, there have been available control methods respectively described in Japanese Patent Application Laid-open Nos. 105580/1994, 284771/1994 and 317698/1996.

As a method for estimating a constant of the induction motor, there has been available a method described in Japanese Patent Application Laid-Open No. 80100/1996. According to the constant estimation method disclosed therein, when an actual value of a primary magnetic flux coincides with a set value obtained by the product of primary self-inductance and an exciting current, a constant of the induction motor can be estimated based on an error current of zero. Another method available for estimating a constant of the induction motor is one described in Japanese Patent Application Laid-Open No. 191699/1997. According to the constant estimation method disclosed therein, primary resistance and leakage inductance are estimated according to changes in a d-axis current command value and a d-axis current. The primary resistance is identified when at least one of a frequency command value and a q-axis current is equal to a predetermined value or lower. The leakage inductance is identified when a frequency command value and a q-axis current are both equal to predetermined values or higher.

In the control method of the induction motor available in the conventional art, the induction motor is controlled based on the constant of the induction motor set in the control apparatus. However, the constant of the induction motor may vary due to the temperature of the induction motor. When there is a change in a temperature during running, the constant is also varied. When a d-axis current command is reduced in order to perform control in a wide speed range, the constant may vary because of the effect of magnetic flux saturation inside the induction motor. If there is a difference between the constant of the induction motor set in the control apparatus and an actual constant because of such constant fluctuation, then control performance may be deteriorated or an unstable phenomenon may occur.

The conventional method described in Japanese Patent Application Laid-Open No. 80100/1996 cannot be applied to the control system for setting a secondary magnetic flux constant. It is because the method disclosed therein is designed to make a primary magnetic flux coincident with a reference value. Moreover, the method described in Japanese Patent Application Laid-Open No. 191699/1997 is designed to switch constants to be estimated between the frequency command value and the q-axis current. Consequently, shocks may occur in the vicinity of a switched frequency during acceleration/deceleration. A term regarding a speed electromotive force by a magnetic flux cannot be estimated.

SUMMARY OF THE INVENTION

It is an object of the present invention to provide a control apparatus of an induction motor, capable of suppressing the deterioration of control performance caused by the setting errors or the fluctuation of constants of the induction motor during running, the constants being used for control in a control method for setting a secondary magnetic flux constant, by estimating primary resistance, an inductance ratio or primary self-inductance, and leakage inductance among such constants.

In order to achieve the foregoing object, according to the present invention, there is provided a control apparatus of an induction motor, comprising: a detector for detecting a primary current of the induction motor; primary current component detecting means for detecting an exciting current and a torque current from the current detected by the detector; correcting means for outputting a correction voltage to set zero a difference between an exciting current command value and the exciting current outputted from the primary current detecting means; frequency voltage control means for outputting a frequency command and a voltage command based on an output of the correcting means, primary resistance, an inductance ratio between mutual inductance and secondary self-inductance, and leakage inductance of the induction motor; and at least one selected from fist to third constant correcting means, the first constant correcting means being for correcting the primary resistance based on a quantity obtained by multiplying a quantity of a voltage command outputted from the frequency voltage control means by the output of the correcting means, the quantity of the voltage command being a result of partial differentiation with the primary resistance, the second constant correcting means for correcting the leakage inductance based on a quantity obtained by multiplying a quantity of the voltage command outputted from the frequency voltage control means by the output of the correcting means, the quantity of the voltage command being a result of partial differentiation with the leakage inductance, and the third constant correcting means for correcting the inductance ratio based on a quantity obtained by multiplying a quantity of the voltage command outputted from the frequency voltage control means by the output of the correcting means, the quantity of the voltage command being a result of partial differentiation with the inductance ratio. Thus, among constants of the induction motor used for control, primary resistance, an inductance ratio or primary self-inductance, and leakage inductance can be set optimal according to a running state, making it possible to suppress the deterioration of control performance caused by the setting errors or the fluctuation of these constants during running.

DETAILED DESCRIPTION OF THE EMBODIMENTS

Next, the preferred embodiments of the present invention will be described with reference to the accompanying drawings.

Figure 1:
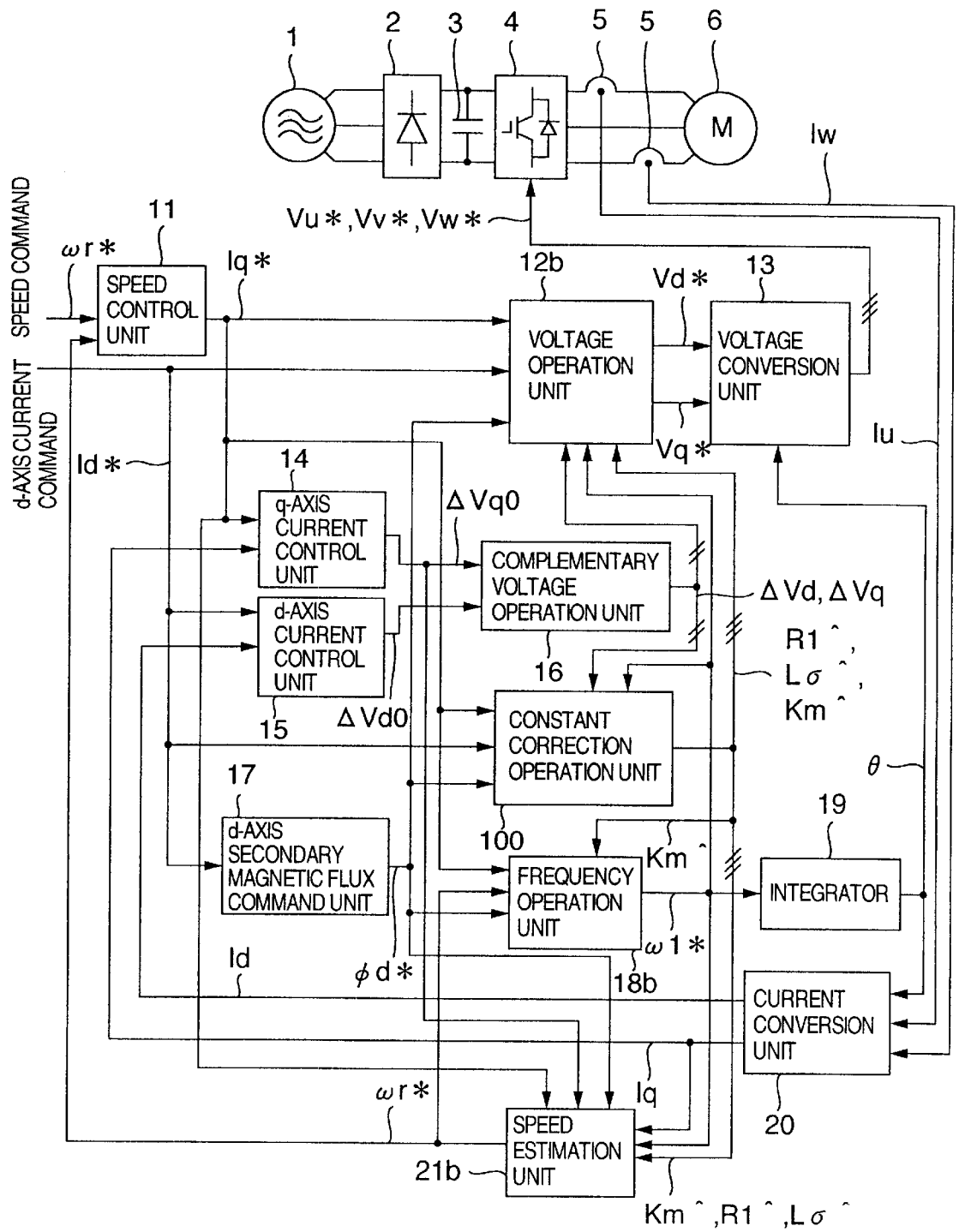
FIG. 1 is a constitutional view of a control apparatus for an induction motor according to a first embodiment of the present invention.
Figure 3:
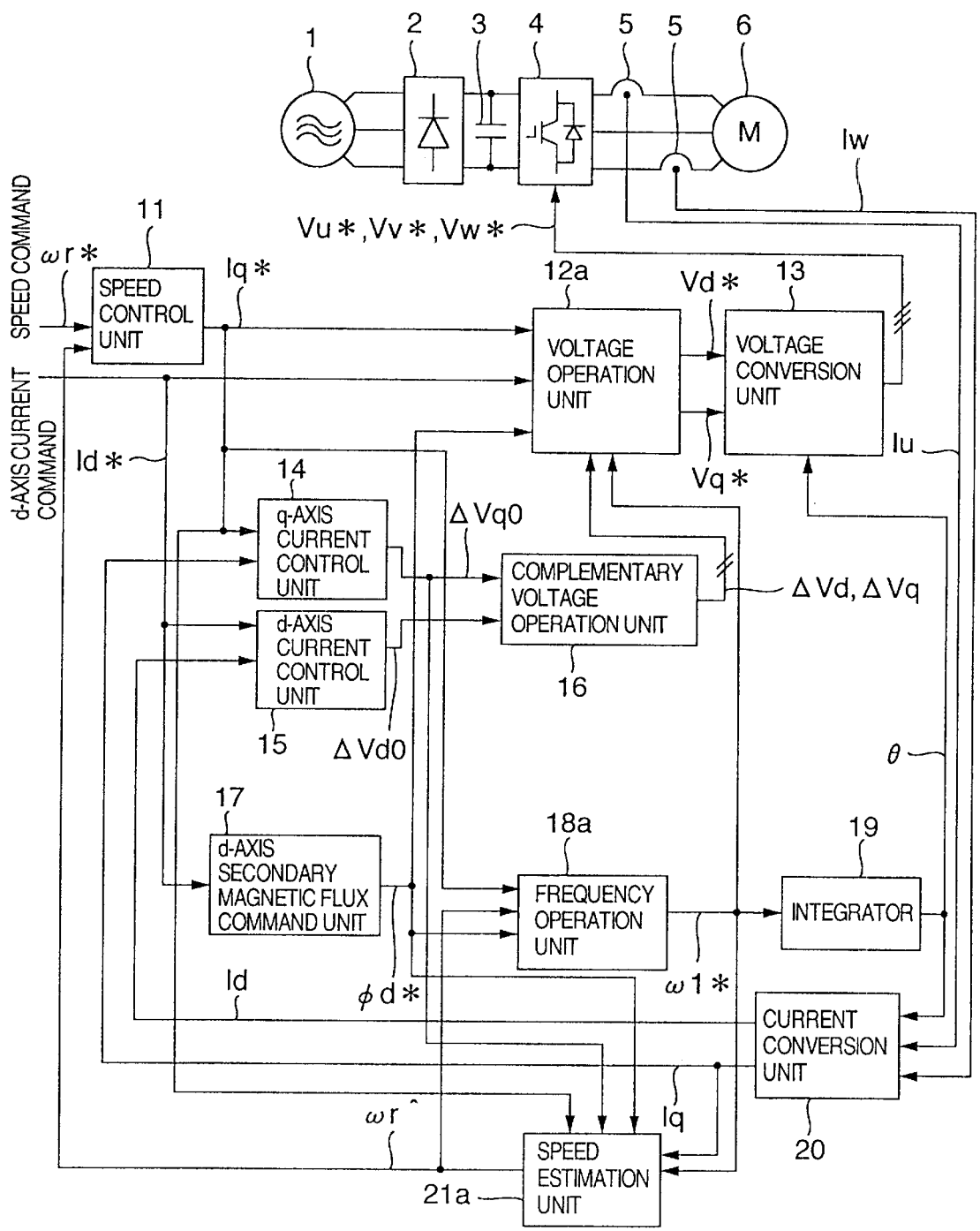
FIG. 3 is a constitutional view of a conventional control apparatus for an inductor motor.

FIG. 1 illustrates the constitution of a control apparatus for an induction motor according to a first embodiment of the present invention. In FIG. 1, a reference numeral 1 denotes an AC power source; 2 a converter; 3 a smoothing capacitor; 4 an inverter; 5 a current detector; 6 an induction motor; 11 a speed control unit; 12b a voltage operation unit; 13 a voltage conversion unit; 14 a q-axis current control unit; 15 a d-axis current control unit; 16 a correction voltage operation unit; 17 a d-axis secondary magnetic flux command unit; 18b a frequency operation unit; 19 an integrator; 20 a current conversion unit; 21b a speed estimation unit; and 100 a constant correction operation unit. The same components as in the conventional example of FIG. 3 are denoted by the same reference numerals, and so the explanation of these components will be omitted.

The voltage operation unit 12b computes d-axis and q-axis voltage commands Vd* and Vq* based on an expression (9) using d-axis and q-axis current commands Id* and Iq*, a frequency command value ω1*, d-axis and q-axis voltage correction quantities ΔVd and ΔVq, the estimated values R1^, Lσ^ and Km^ respectively of primary resistance, leakage inductance and an inductance ratio outputted from the constant correction operation unit 100, and a d-axis secondary magnetic flux command φd*.

$$\begin{pmatrix} Vd^* \\ Vq^* \end{pmatrix} = \begin{pmatrix} R1^\wedge & \omega 1^* \cdot L\sigma^\wedge \\ \omega 1^* \cdot L\sigma^\wedge & R1^\wedge \end{pmatrix} \cdot \begin{pmatrix} Id^* \\ Iq^* \end{pmatrix} + \begin{pmatrix} 0 \\ \omega 1^* \cdot Km^\wedge \cdot \phi d^* \end{pmatrix} + \begin{pmatrix} \Delta Vd \\ \Delta Vq \end{pmatrix} \quad (9)$$

A reason for such computation is now explained. A voltage equation of the induction motor 6 rotated at a frequency ω1 on a rotational coordinate axis is represented by an expression (10). In the expression (10)m, below, Vd denotes an actual d-axis voltage; Vq an actual q-axis voltage; Id an actual d-axis current; Iq an actual q-axis current; φd an actual d-axis secondary magnetic flux; φq an actual q-axis secondary magnetic flux; R1 actual primary resistance; Km an actual inductance ratio; R2 a secondary resistance value; Lσ actual leakage inductance; M mutual inductance; L2 secondary inductance; ωr a rotational speed of the induction motor 6; and ωs a slip frequency, which is a difference between a frequency ω1 and a speed ωr.

If a q-axis secondary magnetic flux φq is represented by an expression (11) so as to set the direction of a secondary magnetic flux parallel to a d axis, then a d-axis secondary magnetic flux φd is represented by an expression (12) in a steady state (S=0) from the third line of the expression (10).

$$\phi q = 0 \quad (11)$$

$$\phi d = M \cdot id \quad (12)$$

Expressions (13) and (14) can be derived respectively from the first, the second and the fourth lines of the expression (10). In the expressions, ωr=ω1−ωs is set.

$$\begin{pmatrix} Vd \\ Vq \end{pmatrix} = \begin{pmatrix} R1 & -\omega 1 \cdot L\sigma \\ \omega 1 \cdot L\sigma & R1 + Km^2 \cdot R2 \end{pmatrix} \cdot \begin{pmatrix} Id \\ Iq \end{pmatrix} + \begin{pmatrix} 0 \\ \omega r \cdot Km \cdot \phi d \end{pmatrix}$$
$$= \begin{pmatrix} R1 & -\omega 1 \cdot L\sigma \\ \omega 1 \cdot L\sigma & R1 \end{pmatrix} \cdot \begin{pmatrix} Id \\ Iq \end{pmatrix} + \begin{pmatrix} 0 \\ \omega 1 \cdot Km \cdot \phi d \end{pmatrix} \quad (13)$$

$$\omega s = \frac{R2 \cdot Km}{\phi d} \cdot Iq \quad (14)$$

It is now assumed, as represented by the following expressions (15) and (16), that there are respective coincidences between actual primary resistance R1 and a primary resistance estimated value R1^, between actual leakage inductance Lσ and a leakage inductance estimated value Lσ^, and between an actual inductance ratio Km and an inductance ratio estimated value Km^, and d-axis and q-axis voltage correction quantities ΔVd and ΔVq are both 0.

$$\begin{pmatrix} R1^\wedge \\ L\sigma^\wedge \\ Km^\wedge \end{pmatrix} = \begin{pmatrix} R1 \\ L\sigma \\ Km \end{pmatrix} \quad (15)$$

$$\begin{pmatrix} \Delta vd \\ \Delta vq \end{pmatrix} = \begin{pmatrix} 0 \\ 0 \end{pmatrix} \quad (16)$$

The q-axis current Iq is controlled so as to coincide with the q-axis current command Iq* by the q-axis current control unit 14. Similarly, the d-axis current Id is controlled so as to coincide with the d-axis current command Id* by the d-axis current control unit 15. Accordingly, the following expression (17) is established.

$$\begin{pmatrix} Id^* \\ Iq^* \end{pmatrix} = \begin{pmatrix} Id \\ Iq \end{pmatrix} \quad (17)$$

In addition, a rotational frequency ω1 on the rotational coordinate axis can be set optionally. Thus, if it is set to coincide with a frequency command value ω1*, then the following expression (18) is established.

$$\omega 1^* = \omega 1 \quad (18)$$

$$\begin{pmatrix} Vd \\ Vq \\ 0 \\ 0 \end{pmatrix} = \begin{pmatrix} R1 + Km^2 \cdot R2 + s \cdot L\sigma & -\omega 1 \cdot L\sigma & -\dfrac{Km^2 \cdot R2}{M} & -\omega r \cdot Km \\ \omega 1 \cdot L\sigma & R1 + Km^2 \cdot R2 + s \cdot L\sigma & \omega r \cdot Km & -\dfrac{Km^2 \cdot R2}{M} \\ -R2 \cdot Km & 0 & \dfrac{R2}{L2} + s & -\omega s \\ 0 & -R2 \cdot Km & \omega s & \dfrac{R2}{L2} + s \end{pmatrix} \times \begin{pmatrix} Id \\ Iq \\ \phi d \\ \phi q \end{pmatrix} \quad (10)$$

Further, d-axis and q-axis voltages Vd and Vq are set to respectively coincide with d-axis and q-axis voltage commands Vd* and Vq* by the functions of the inverter 4 and the voltage conversion unit 13. Accordingly, to establish the expressions (11) and (12) from the expression (13), a voltage must be controlled based on the expression (9).

At the frequency operation unit 18, a frequency command value ω1* is computed based on an expression (19) using the d-axis secondary magnetic flux command φd*, the q-axis current command Iq*, the speed estimated value ωr^ outputted from the speed estimation unit 21a, and the inductance ratio estimated value Km^ outputted from the constant correction operation unit 100. This is for the purpose of satisfying the relation represented by the expression (14).

$$\omega 1^* = \omega r^\wedge + \frac{R2^* \cdot Km^\wedge}{\phi d^*} \cdot Iq^* \qquad (19)$$

At the speed estimation unit 21b, a speed estimated value ωr^ is computed from the d-axis secondary magnetic flux command φd*, the q-axis current Iq, the q-axis current command Iq*, the frequency command value ω1*, the output Δd0 of the q-axis current control unit 14, and the primary resistance estimated value R1^, the leakage inductance estimated value Lσ^, and the inductance ratio estimated value Km^ outputted form the constant correction operation unit 100. If the expressions (11) to (18) are applied for the second lines respectively of the expressions (9) and (10) to calculate a speed ωr, then an expression (20) is established, and a speed estimated value ωr^ can be obtained by an expression (21).

$$\omega r = \frac{1}{Km \cdot \phi d} \times \{Km \cdot \phi d \cdot \omega 1 + R1 \cdot Iq^* - \qquad (20)$$
$$(R1 + Km^2 \cdot R2 + L\sigma \cdot s) \cdot Iq\}$$

$$\omega r^\wedge = \frac{1}{1 + T1 \cdot s} \times \frac{1}{Km^\wedge \phi d^*} \times \{Km^\wedge \cdot \phi d^* \omega 1^* + R1^\wedge \cdot Iq^* - \qquad (21)$$
$$(R1^\wedge Km^{\wedge 2} \cdot R2^* + L\sigma^\wedge \cdot s) \cdot Iq + \Delta Vq0\}$$

The control of the induction motor 6 in the foregoing manner sets the direction of a secondary magnetic flux parallel to a d-axis magnetic flux. While the d-axis current command is kept constant, the size of the secondary magnetic flux proportional to the d-axis current command is also constant. Accordingly, the q-axis current orthogonal to the secondary magnetic flux is set proportional to torque. Thus, by controlling the q-axis current, torque can be controlled.

In the constant correction operation unit 100, in order to set the secondary magnetic flux parallel to the d axis, an arithmetic operation is carried out to establish the expression (15) for the primary resistance estimated value R1^, the leakage inductance estimated value Lσ^, and the inductance ratio estimated value Km^ outputted from the constant correction operation unit 100. The expression (16) is established when the expression (15) holds true. Accordingly, the primary resistance estimated value R1^, the leakage inductance estimated value Lσ^, and the inductance ratio estimated value Km^ are corrected in such a way as to set zero the d-axis and q-axis voltage correction quantities ΔVd and ΔVq.

The problem in this case is the impossibility of uniquely deciding each correction quantity. This is because the three quantities, i.e., the primary resistance estimated value R1^, the leakage inductance estimated value Lσ^, and the inductance ratio estimated value Km^, are corrected based on the two quantities including the d-axis and q-axis voltage correction quantities ΔVd and ΔVq. Thus, when corrections are made for such estimated values, the corrections are carried out in accordance with the proportions of effects on the d-axis and q-axis voltage correction quantities ΔVd and ΔVq. In other words, the voltage command of each axis is partially differentiated with an estimated value to be corrected, each constant is multiplied, and each own complementary voltage correction quantity is multiplied. Such an arithmetic operation is carried out for each axis, and the operation results of all the axes are added together and integrated to obtain an estimated value to be corrected. Specifically, the corrections are carried out in accordance with expressions (22) to (24). In the expressions, T denotes a gain for deciding estimation response.

$$R1^\wedge = \frac{1}{T \cdot s} \cdot \left\{ R1^* \cdot \left( \frac{\partial Vd^*}{\partial R1^\wedge} \cdot \Delta Vd + \frac{\partial Vq^*}{\partial R1^\wedge} \cdot \Delta Vq \right) \right\} + R1^* \qquad (22)$$

$$L\sigma^\wedge = \frac{1}{T \cdot s} \cdot \left\{ L\sigma^* \cdot \left( \frac{\partial Vd^*}{\partial L\sigma^\wedge} \cdot \Delta Vd + \frac{\partial Vq^*}{\partial L\sigma^\wedge} \cdot \Delta Vq \right) \right\} + L\sigma^* \qquad (23)$$

$$Km^\wedge = \frac{1}{T \cdot s} \cdot \left\{ Km^* \cdot \left( \frac{\partial Vd^*}{\partial Km^\wedge} \cdot \Delta Vd + \frac{\partial Vq^*}{\partial Km^\wedge} \cdot \Delta Vq \right) \right\} + Km^* \qquad (24)$$

Figure 2:
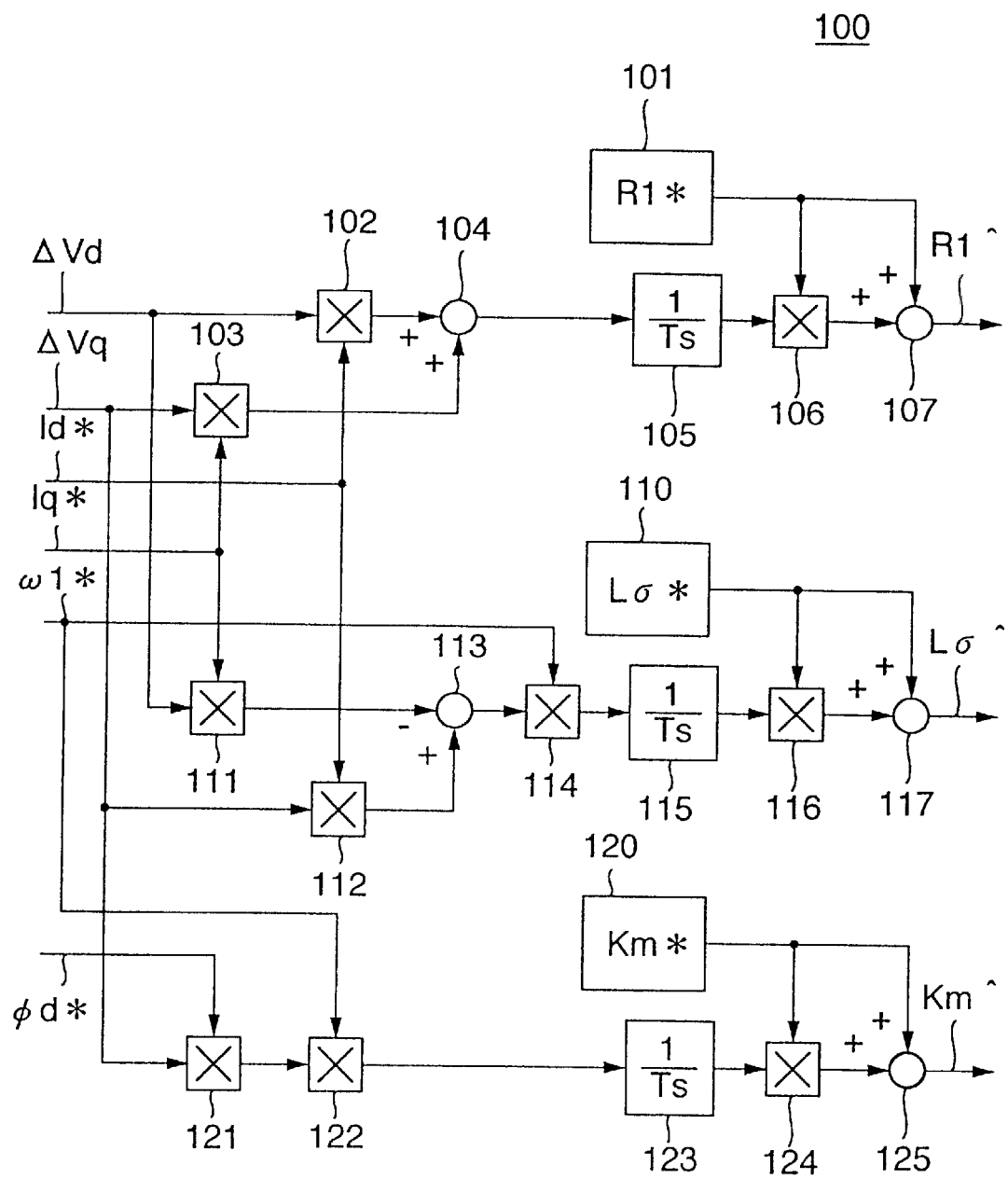
FIG. 2 is a constitutional view showing a constant correction operation unit of the first embodiment.

FIG. 2 illustrates the specific block of the constant correction operation unit 100 for realizing the foregoing.

In the drawing, a reference numeral 101 denotes a primary resistance setter; 110 a leakage inductance setter; 120 an inductance ratio setter; each of 102, 103, 106, 111, 112, 114, 116, 121, 122 and 124 a multiplier; each of 104, 107, 117 and 125 an adder; 113 a subtracter; and each of 105, 115 and 123 an integrator.

The d-axis voltage correction quantity ΔVd and the d-axis current command Id* are connected to the multiplier 102, and the q-axis voltage correction quantity ΔVq and the q-axis current command Iq* are connected to the multiplier 103. The outputs of the multipliers 102 and 103 are added up by the adder 104, and the output of the adder 104 is integrated by the integrator 105. The output of the integrator 105 and the output of the primary resistance setter 101 having a primary resistance set value R1* set are connected to the multiplier 106. The outputs of the multiplier 106 and the primary resistance setter 101 are added up by the adder 107, and then outputted as a primary resistance estimated value R1^.

The d-axis voltage correction quantity ΔVd and the q-axis current command Iq* are connected to the multiplier 111, and the q-axis voltage correction quantity ΔVq and the d-axis current command Id* are connected to the multiplier 112. The output of the multiplier 111 is subtracted from the output of the multiplier 112 by the subtracter 113. The output of the subtracter 113 and a frequency command (ω1* are connected to the multiplier 114, and the output of the multiplier 114 is integrated by the integrator 115. The outputs of the integrator 115 and the leakage inductance setter 110 having a leakage inductance set value Lσ* set are connected to the multiplier 116. The outputs of the multiplier 116 and the leakage inductance setter 110 are added up by the adder 117, and then outputted as a leakage inductance estimated value Lσ^.

In addition, the q-axis voltage correction quantity ΔVq and the d-axis secondary magnetic flux command φd* are connected to the multiplier 121, and the output of the multiplier 121 and a frequency command ω1* are connected to the multiplier 122. The output of the multiplier 122 is integrated by the integrator 123. The outputs of the integrator 123 and the inductance ratio setter 120 having an inductance ratio set value Km* set are connected to the multiplier 124. The outputs of the multiplier 124 and the inductance ratio setter 120 are added up by the adder 125, and then outputted as an inductance ratio estimated value Km^.

With the foregoing constitution, the primary resistance estimated value R1^, the leakage inductance estimated value Lσ^, and the inductance ratio Km^ are corrected in such a way as to set zero the d-axis and q-axis voltage correction quantities ΔVd and ΔVq. In addition, under all the conditions, the primary resistance estimated value R1^, the leakage inductance estimated value Lσ^, and the inductance ratio estimated value Km^ are corrected at proper proportions.

Figure 4:
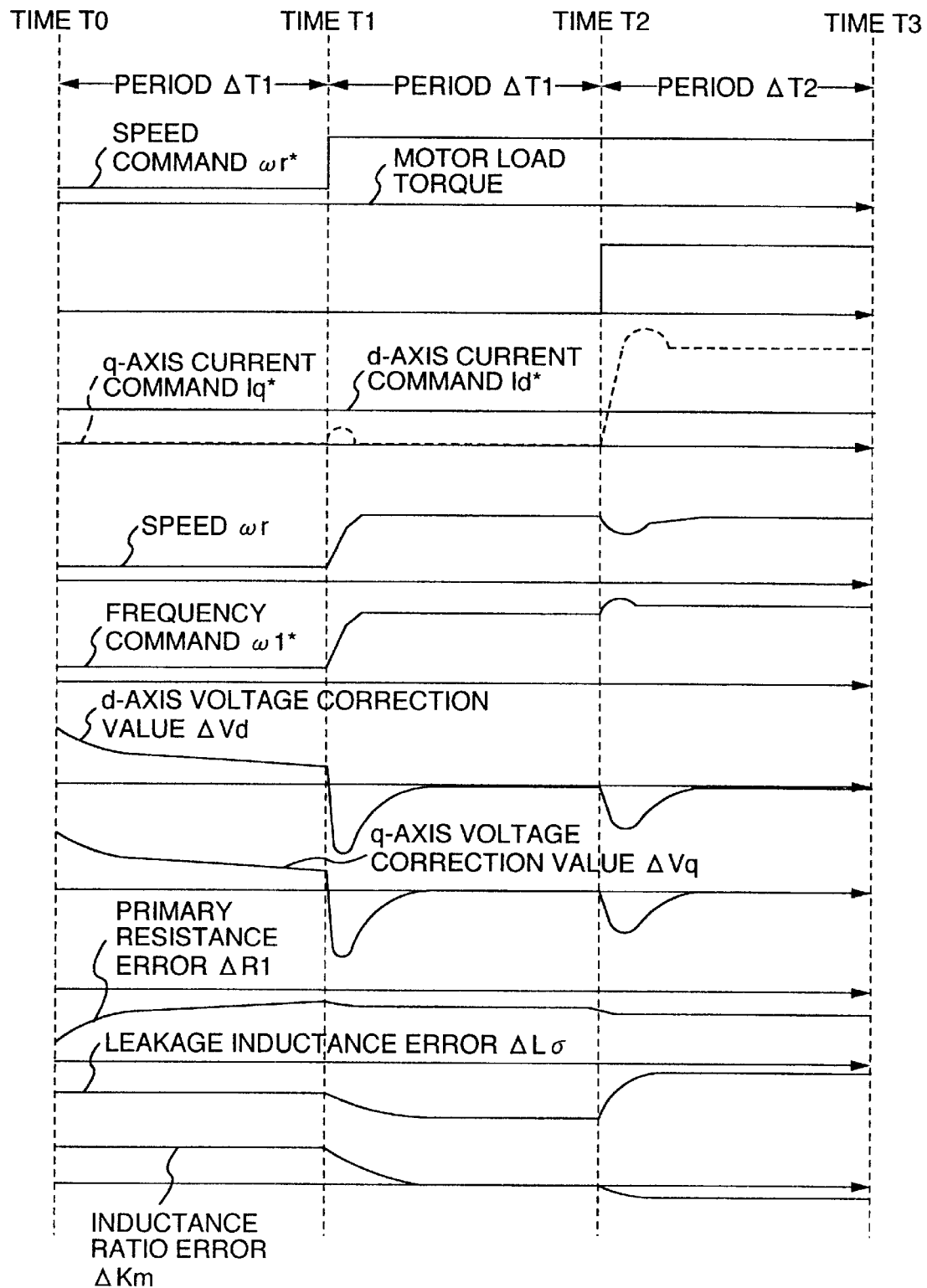
FIG. 4 is a view illustrating an operation of the first embodiment of the present invention.

Next, description will be made of an example of the operation of the embodiment by referring to FIG. 4. In FIG. 4, an abscissa indicates time, and an ordinate indicates, in order from above, a speed command ωr*, motor torque load, a d-axis current command Id*, a q-axis current command Iq*, a speed ωr, a frequency command ω1*, a d-axis voltage correction value ΔVd, a q-axis voltage correction value ΔVq, a primary resistance error ΔR1, a leakage inductance error ΔLσ, and an inductance ratio error Δkm. In this case, the primary resistance error ΔR1 represents a difference between a primary resistance estimated value R1^ and actual primary resistance R1; the leakage inductance error ΔLσ a difference between a leakage inductance estimated value Lσ^ and actual leakage inductance Lσ; and the inductance ratio error Δkm a difference between an inductance ratio estimated value Km^ and an actual inductance ratio Km.

First, the initial state of the constant correction operation unit 100 assumed in FIG. 4 is explained. It is assumed that at time T0, the value of a primary resistance error ΔR1 is negative, the value of a leakage inductance error ΔLσ negative, and the value of an inductance ratio error Δkm positive. It is also assumed that at the time T0, there are respective coincidences between a primary resistance estimated value R1^ and the output of the primary resistance setter 101, between a leakage inductance estimated value Lσ^ and the output of the leakage inductance setter 110, and between an inductance ratio estimated value Km^ and the output of the inductance ratio setter 120. In other words, it is assumed that the outputs of the integrators 105, 115 and 123 are all 0.

Next, running conditions assumed in FIG. 4 are explained. The value of a speed command ωr* is small in a period ΔT1 from the time T0 to time T1, and it is changed to a large value at the time T1. Then, this large value is maintained in a period until time T3, i.e., from a period ΔT2 to a period ΔT3. The value of motor load torque is 0 in a period from the time T0 to time T2, i.e., from the period ΔT1 to the period, becoming positive at the time T2. Then, this positive value is maintained in a period until the time T3, i.e., in the period ΔT3.

Now, the operation of the constant correction operation unit 100 in the above case is explained. The d-axis current command Id* is maintained constant in the period from the time T0 to the time T3. The q-axis current command Iq* has a close relation to the motor load torque, and takes a positive value at the time T1 to accelerate the motor. However, the value thereof is substantially 0 from the period ΔT to the period ΔT2, and becomes positive in the period ΔT3. The speed ωr is controlled to coincide with the speed command ωr* by the functions of the speed control unit 11 and the speed estimation unit 21b. Hence, the value of the speed ωr is small in the period ΔT1, and large from the period ΔT2 to the period ΔT3. This value is slightly reduced at the time T2, because the output torque of the motor is delayed with respect to the increase of the motor load torque. The frequency command ω1* substantially coincides with the speed ωr in the periods ΔT1 and ΔT2 having motor load torque of 0, because the value 0 of the q-axis current command Iq* also sets slippage 0. The value thereof is small in the period ΔT1, and large in the period ΔT2. In the period ΔT3, since the motor load torque takes a positive value, and the q-axis current command Iq* also take a positive value, the frequency command ω1* is increased by an amount equivalent to a slip frequency.

Next, the operation of the constant correction operation unit 100 shown in FIG. 4 is described. At the time T0, the values of the primary resistance error ΔR1, the leakage inductance error ΔLσ and the inductance ratio error Δkm are respectively negative, negative and positive, the frequency command value ω1* is small, and the q-axis current command Iq* is 0. A part from the right side of the first line of the expression (9) excluding the d-axis voltage correction quantity ΔVd takes a smaller value compared with that when the primary resistance error ΔR1 is 0, because the value of the primary resistance error ΔR1 is negative. Accordingly, a small d-axis current Id flows, the output ΔVd0 of the d-axis current control unit 15 is increased, and the d-axis voltage correction quantity ΔVd is also increased. In other words, the d-axis voltage correction quantity ΔVd is controlled in such a way as to set a d-axis current command Vd* equal to that when the primary resistance error ΔR1 is 0. Thus, the d-axis voltage correction quantity ΔVd takes a positive value. On the other hand, since the output ΔVd0 of the d-axis current control unit 15 is increased, the q-axis voltage correction quantity ΔVq takes a positive value as in the case of the d-axis voltage correction quantity ΔVd. This is because of the relation represented in the expression (3). In this case, since the speed estimation unit 21b controls the speed estimated value such that the output ΔVd0 of the q-axis current control unit 14 cab be set 0, the effect of the output ΔVd0 of the q-axis current control unit 14 can be ignored.

Now, the operation of the constant correction operation unit 100 in the period ΔT1 is described. The gain of the integrator 105 from the d-axis voltage correction quantity ΔVd is large, the frequency command value ω1* is small, and the q-axis current command is 0. Thus, the gain of the integrator 105 from the q-axis voltage correction quantity ΔVq, the gain of the integrator 115 from the d-axis and q-axis voltage correction quantities ΔVd and ΔVq, and the gain of the integrator 123 from the q-axis voltage correction quantity ΔVq are small. Accordingly, the input of the integrator 105 takes a positive value, the primary resistance estimated value is increased, and the primary resistance error ΔR1 is increased. Also, a part from the right side of the first line of the expression (9) excluding the d-axis voltage correction quantity ΔVd is increased, and the output ΔVd0 of the d-axis current control unit 15 and the d-axis voltage correction quantity ΔVd are reduced. A reduction also follows in the q-axis voltage correction quantity ΔVq. On the other hand, almost no changes occur in the leakage inductance error ΔLσ and the inductance ratio error Δkm, because of the small inputs of the integrators 115 and 123. In other words, in the period ΔT1, correction concentrates on the primary resistance error because of the large effect of the primary resistance error in the expression (9). On the other hand, almost no q-axis voltage corrections are carried out for the leakage inductance error and the inductance ratio error, because of the small effects of the leakage inductance error and the inductance ratio error.

Subsequently, when the frequency command ω1* becomes large at the time T1, the second line of the expression (9) is set larger relative to the first line. Thus, the relation of the q-axis voltage described in the second line becomes important. Because of the positive value of the inductance ratio ΔKm, the part from the right side of the second line of the expression (9) excluding the q-axis voltage correction quantity ΔVq takes a larger value compared with that when the inductance ratio error ΔKm is 0. Accordingly, when the q-axis voltage correction quantity ΔVq is 0, the q-axis voltage becomes large, increasing a speed electromotive force. Thus, a d-axis magnetic flux is increased. Then, the d-axis current is increased, the output ΔVd0 of the d-axis current control unit 15 is thereby reduced, bringing about reductions in the d-axis and q-axis voltage correction quantities ΔVd and ΔVq. As a result, the d-axis and q-axis voltage correction quantities ΔVd and ΔVq take negative values.

Now, the operation of the constant correction operation unit 100 in the period ΔT2 is described. The gain of the integrator 105 from the d-axis voltage correction quantity ΔVd is equal to that in the period ΔT1. However, because of the larger value of the frequency command ω1*, the gains of the integrators 115 and 123 from the q-axis voltage correction quantity ΔVq are larger. In addition, because the q-axis current command is 0, the gain of the integrator 105 from the q-axis voltage correction quantity ΔVq and the gain of the integrator 115 from the d-axis voltage correction quantity ΔVd are both 0. In this case, because of the larger value of the frequency command ω1*, the inputs of the integrators 115 and 123 are larger compared with that of the integrator 105. Because of the negative value of the q-axis voltage correction quantity ΔVq, the output of the integrator 123 is reduced, and the inductance ratio estimated value Km^ is reduced. Hence, the inductance ratio error ΔKm is also reduced. With the reduction of the inductance ratio estimated value Km^, the part from the right side of the second line of the expression (9) excluding the q-axis voltage correction quantity ΔVq is reduced, while the output ΔVd0 of the d-axis current control unit 15 is increased. Accordingly, the d-axis and q-axis voltage correction quantities ΔVd and ΔVq are increased to approach 0. In addition, the primary resistance estimated value R1^ is reduced, because the input of the integrator 105 takes a negative value. However, the quantity of correction is limited as the d-axis and q-axis voltage correction quantities ΔVd and ΔVq are increased to approach 0. Since the q-axis current command Iq* is 0, the input of the integrator 115 takes a negative value, the leakage inductance estimated value ΔLσ^ is reduced, and the leakage inductance error ΔLσ is also reduced. In other words, in the period ΔT2, correction concentrates on the inductance ratio error because of the large effect of the inductance ratio error in the expression (9). Consequently, the primary resistance estimated value R1^ or the leakage inductance estimated value ΔLσ^ may be corrected reversely to the direction of intended correction. However, a constant error is brought closer to 0 by carrying out correction under the same various conditions as described later with reference to FIG. 5.

Subsequently, when the q-axis current command Iq* becomes large at the time T2, though the second line of the expression (9) is still larger relative to the first, since the correction of the inductance ratio estimated value Km^ has been almost finished before the time T2, the fist line of the expression (9) becomes important. Because of the large value of the frequency command ω1*, the effect of the leakage inductance error ΔLσ is larger than that of the primary resistance error ΔR1 in the right side of the first line of the expression (9). Since the leakage inductance error ΔLσ takes a negative value, a part from the right side of the first line of the expression (9) excluding the d-axis voltage correction quantity ΔVd takes a larger value compared with that when the error is 0, and the value of the d-axis voltage correction quantity ΔVd becomes negative. Accordingly, since the output ΔVd0 of the d-axis current control unit 15 is negative, the value of the q-axis voltage correction quantity ΔVd is also negative.

Now, the operation of the constant correction operation unit 100 in the period T3 is described. The gain of the integrator 105 from the d-axis voltage correction quantity ΔVd is equal to that in the periods ΔT1 and ΔT2. Also, the gains of the integrators 115 and 123 from the q-axis voltage correction quantity ΔVq are large as in the case of the period ΔT2. Further, since the q-axis current command takes a positive value, the gains of the integrators 105 and 115 from the q-axis voltage correction quantity ΔVq are larger. In this case, since the q-axis current command Iq* is larger than the d-axis current command Id*, the gain of the integrator 115 from the q-axis voltage correction quantity ΔVq is larger than that of the same from the d-axis voltage correction quantity ΔVd. In addition, as in the case of the period ΔT2, the frequency command ω1* is large, the inputs of the integrators 123 and 115 are larger compared with the gain of the integrator 105.

Since the gain of the integrator 115 from the d-axis voltage correction quantity ΔVd is large, and the d-axis voltage correction quantity ΔVd is connected through the multiplier 111 to the subtracter 113, the input of the integrator 115 takes a positive value. Thus, the output of the integrator 115 is increased, and the leakage inductance estimated value ΔLσ^ and the leakage inductance error ΔLσ^ are increased to approach 0. On the other hand, since the input of the integrator 123 takes a negative value, the output of the integrator 123 is reduced, and the inductance ratio estimated value Km^ and the inductance ratio error ΔKm are also reduced. In addition, the primary resistance estimated value R1^ is reduced because the input of the integrator 105 takes a negative value. However, the quantity of correction is limited, since the d-axis and q-axis voltage correction quantities ΔVd and ΔVq are increased to approach 0.

In other words, in the period ΔT3, correction concentrates on the leakage inductance error, because of the large effect of the inductance error in the expression (9). Thus, the primary resistance estimated value R1^ or the inductance ratio Km^ may be corrected reversely to the direction of intended correction. However, since the error is in the direction of reduction as a whole, the constant error is brought closer to 0 by carrying out correction under the same various conditions as described later with reference to FIG. 5.

Figure 5:
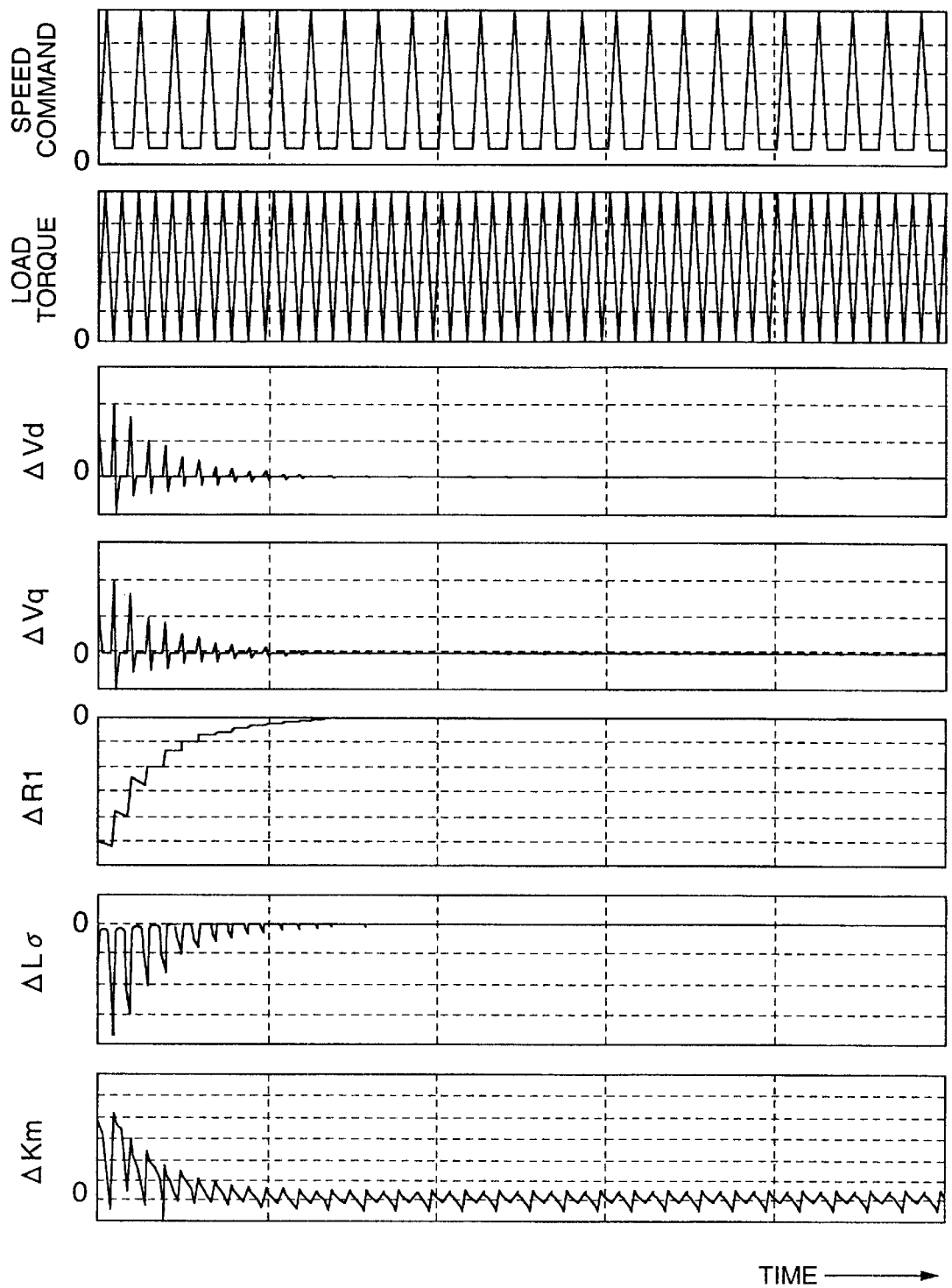
FIG. 5 is a waveform view of a long continuous operation of the first embodiment.

FIG. 5 shows an operation waveform when the control of the embodiment is continued for a long time. In FIG. 5, an abscissa of each graph indicates time, and an ordinate indicates, in order from above, a speed command ωr*, load torque applied on the induction motor 6, a d-axis voltage correction quantity ΔVd, a q-axis voltage correction quantity ΔVq, deviation ΔR1 between actual primary resistance and a primary resistance estimated value R1^, deviation ΔLσ between actual leakage inductance Lσ and a leakage inductance estimated value Lσ^, and deviation ΔKm between an actual inductance ratio Km and an inductance ratio estimated value Km^.

Before the start of running, error values with respect to the actual primary resistance R1, the actual leakage inductance Lσ and the actual inductance ratio Km are set in the primary resistance setter 101, the leakage inductance setter 110, and the inductance ratio setter 120, and a speed command is added on the graph first from the above, load torque on the second graph, and so on. In this case, at a point of changes in running conditions, the absolute values of the d-axis and q-axis voltage correction quantities ΔVd and ΔVq are temporarily increased. However, these values are converged to 0 with time. In addition, the deviation ΔR1 of the primary resistance estimated value, the deviation ΔLσ of the leakage inductance estimated value, and the deviation ΔKm of the inductance ratio estimated value are also converged to 0, making it possible to realize constant estimation.

Figure 6:
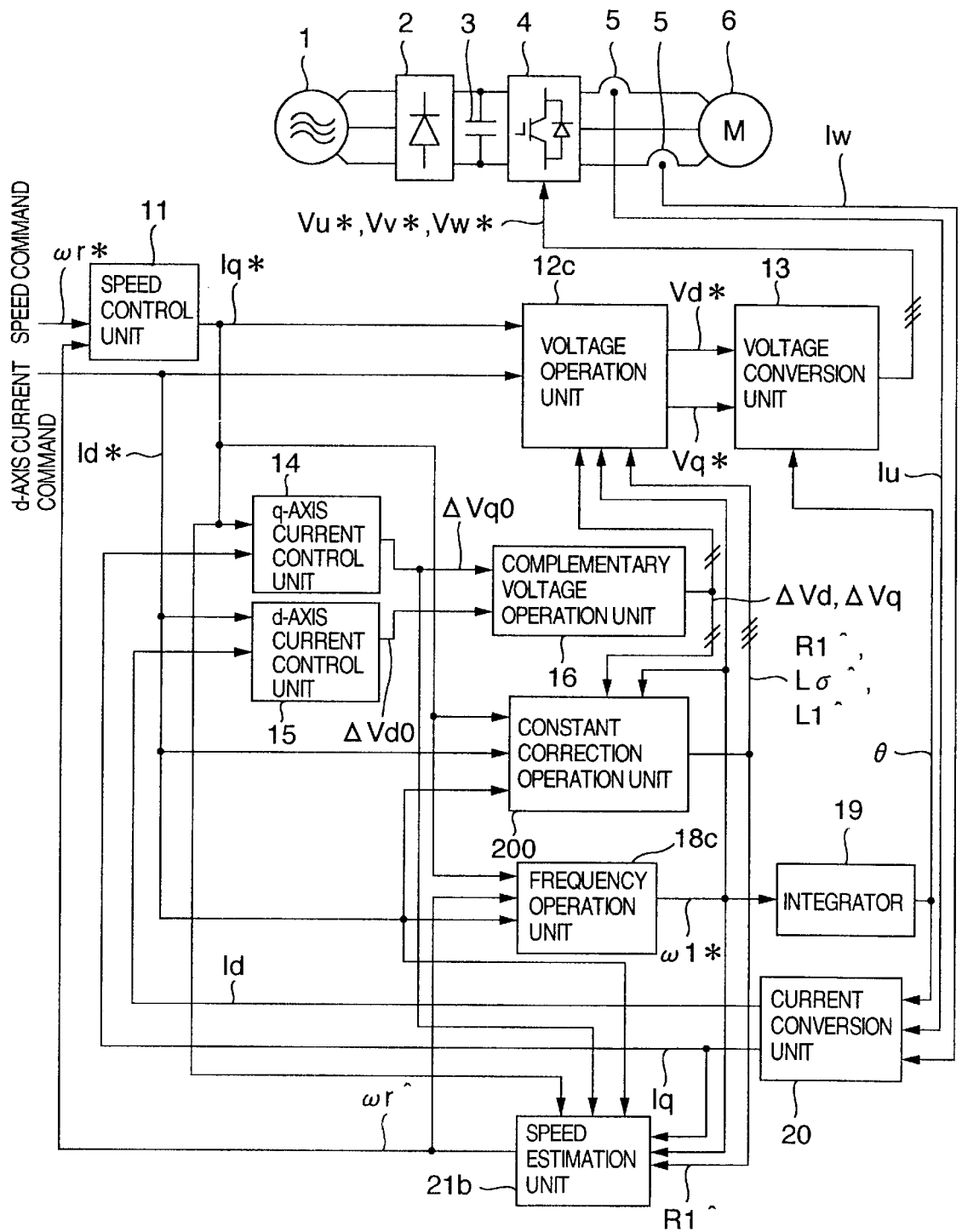
FIG. 6 is a constitutional view of a second embodiment of the present invention.

FIG. 6 is a constitutional view of a second embodiment of the present invention. In FIG. 6, a reference numeral 1 denotes an AC power source; 2 a converter; 3 a smoothing capacitor; 4 an inverter; 5 a current detector; 6 an induction motor; 11 a speed control unit; 12c a voltage operation unit; 13 a voltage conversion unit; 14 a q-axis current control unit; 15 a d-axis current control unit; 16 a correction voltage operation unit; 18c a frequency operation unit; 19 an integrator; 20 a current conversion unit; 21c a speed estimation unit; and 200 a constant correction operation unit. The same components as in the first embodiment shown in FIG. 2 are denoted by the same reference numerals, and so the explanation of these components will be omitted.

The voltage operation unit 12c computes a d-axis voltage command Vd* and a q-axis voltage command Vq* based on an expression (25) using a d-axis current command Id*, a q-axis current command Iq*, a frequency command value ω1*, a d-axis voltage correction quantity ΔVd, a q-axis voltage correction quantity ΔVq, and a primary resistance estimated value R1^, a leakage inductance estimated value Lσ^, and a primary self-inductance estimated value L1^ outputted from the constant correction operation unit 200.

$$\begin{pmatrix} Vd^* \\ Vq^* \end{pmatrix} = \begin{pmatrix} R1^\wedge & -\omega 1^* \cdot L\sigma^\wedge \\ \omega 1^* \cdot L1^\wedge & R1^\wedge \end{pmatrix} \cdot \begin{pmatrix} Id^* \\ Iq^* \end{pmatrix} + \begin{pmatrix} \Delta Vd \\ \Delta Vq \end{pmatrix} \quad (25)$$

The expression (25) is obtained by substituting the expression (5) and (6) for the expression (9), and reorganizing these based on the relation of an expression (26). The same function as that of the voltage operation unit 12b of the first embodiment is realized.

$$L\sigma = L1 - \frac{M^2}{L2} \quad (26)$$

At the frequency operation unit 18c, a frequency command value ω1* is computed based on an expression (27) using the d-axis current command Id*, the q-axis current command Iq*, and a speed estimated value ωr^ outputted from the speed estimation unit 21c. If it is assumed that the estimated value coincides with an actual constant, then the expression (27) is obtained by substituting the expressions (5) and (6) for the expression (19), and control can be executed to satisfy the relation of the expression (14). In the expression below, L2* denotes a set value of secondary self-inductance.

$$\omega 1^* = \omega r^\wedge + \frac{R2^* \cdot Iq^*}{L2^* \cdot Id^*} \quad (27)$$

At the speed estimation unit 21c, a speed estimated value ωr^ is computed based on an expression (28) using a q-axis current Iq, the q-axis current command Iq*, the output ΔVd0 of the q-axis current control unit 14, the frequency command value ω1*, and the primary resistance estimated value R1^ outputted from the constant correction operation unit 200.

$$\omega r^\wedge = \frac{1}{1+T \cdot s} \times \frac{L2^*}{M^{*2} \cdot Id^*} \times \left\{ \frac{M^{*2} \cdot Id^*}{L2^*} \cdot \omega 1^* + R1^\wedge \cdot Iq^* \right.$$
$$\left. -(R1^\wedge + Km^{*2} \cdot R2^* + L\sigma^* \cdot s) \cdot Iq + \Delta Vq0 \right\} \quad (28)$$

As described above, by controlling the induction motor 6, the direction of a secondary magnetic flux is set parallel to the d-axis magnetic flux. While the d-axis current command is constant, the size of the secondary magnetic flux parallel to the d-axis current command is also constant. Accordingly, the q-axis current orthogonal to the secondary magnetic flux is set proportional to torque. As a result, it is possible to control torque by controlling the q-axis current.

In the constant correction operation unit 200, in order to set the secondary magnetic flux parallel to the d axis, an arithmetic operation is carried out in such a way as to establish an expression (29) regarding the primary resistance estimated value R1^, the leakage inductance estimated value Lσ^, and the primary self-inductance L1^ outputted from the constant correction operation unit 200. When the expression (29) is established, the foregoing expression (16) is also established. Thus, the primary resistance estimated value R1^, the leakage inductance estimated value Lσ^, and the primary self-inductance L1^ are corrected so as to set 0 the d-axis and q-axis voltage correction quantities ΔVd and ΔVq.

$$\begin{pmatrix} R1^\wedge \\ L\sigma^\wedge \\ L1^\wedge \end{pmatrix} = \begin{pmatrix} R1 \\ L\sigma \\ L1 \end{pmatrix} \quad (29)$$

The method of correction is similar to that of the first embodiment. When the estimated values are corrected, such corrections are carried out in accordance with the proportions of effects on the d-axis and q-axis voltage correction quantities ΔVd and ΔVq. Specifically, the voltage command of each axis is partially differentiated with an estimated value to be corrected, each constant is multiplied, and each own complementary voltage correction quantity is multiplied. Such computation is carried out for each axis. The results of computation for all the axes are added up and then integrated, thereby setting an estimated value to be corrected. Specifically, correction is carried out based on the foregoing expressions (22) and (23) and the following expression (30).

$$L1^\wedge = \frac{1}{T \cdot s} \cdot \left\{ L1^* \cdot \left( \frac{\partial Vd^*}{\partial L1^\wedge} \cdot \Delta Vd + \frac{\partial Vq^*}{\partial L1^\wedge} \cdot \Delta Vq \right) \right\} + L1^* \quad (30)$$

Figure 7:
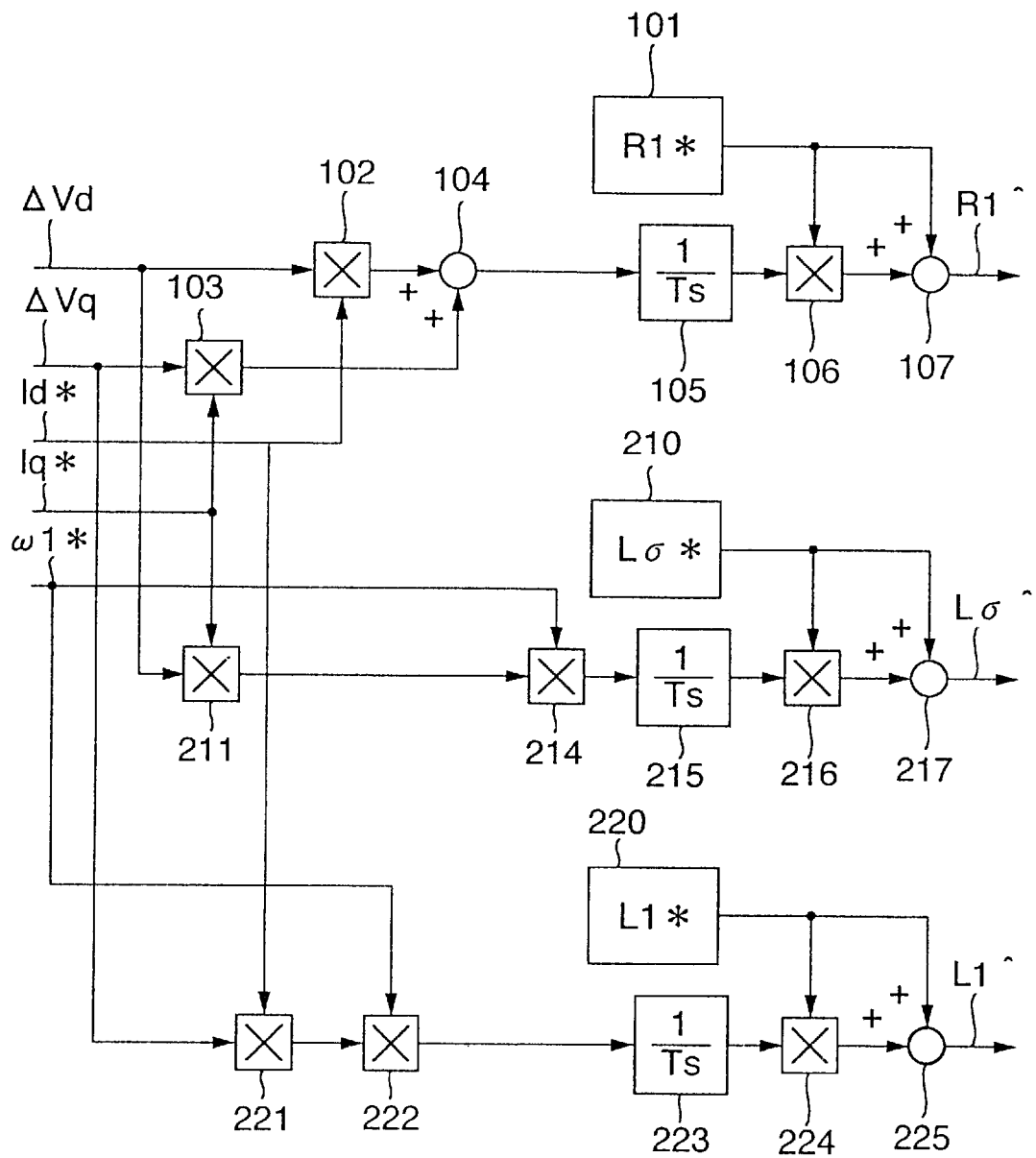
FIG. 7 is a constitutional view showing a constant correction operation unit of the second embodiment.

FIG. 7 shows a specific block of the constant correction operation unit 200 for realizing the foregoing. In the drawing, the same components as in the first embodiment shown in FIG. 2 are denoted by the same reference numerals, and so the explanation of these components will be omitted.

A reference numeral 210 denotes a leakage inductance setter; 220 a primary self-inductance setter; each of 211, 214, 216, 221, 222 and 224 a multiplier; each of 217 and 225 an adder; and each of 215 and 223 an integrator.

The d-axis voltage correction quantity ΔVd and the q-axis current command Iq* are connected to the multiplier 211.

The output of the multiplier 211 and the frequency command ω1* are connected to the multiplier 214, and the output of the multiplier 214 is integrated by the integrator 215. The output of the integrator 215, and the output of the leakage inductance setter 210 having a set value Lσ* of leakage inductance set are connected to the multiplier 216. The output of the multiplier 216 and the output of the leakage inductance setter 210 are added up by the adder 217, and then outputted as a leakage inductance estimated value Lσ^.

In addition, the q-axis voltage correction quantity ΔVq and the d-axis current command Id* are connected to the multiplier 221. The output of the multiplier 221 and the frequency command ω1* are connected to the multiplier 222. The output of the multiplier 222 is integrated by the integrator 223. The output of the integrator 223, and the output of the primary self-inductance setter 220 having a set value L1* of primary self-inductance set are connected to the multiplier 224. The output of the multiplier 224 and the output of the primary self-inductance setter 220 are added up by the adder 225, and then outputted as a primary self-inductance estimated value L1^.

With the foregoing constitution, the primary resistance estimated value R1^, the leakage inductance estimated value Lσ^, and the primary self-inductance estimated value L1^ are corrected in such a way as to set 0 the d-axis and q-axis voltage correction quantities ΔVd and ΔVq. In addition, under all the conditions, the primary resistance estimated value R1^, the leakage inductance estimated value Lσ, and the primary self-inductance estimated value L1^ are corrected at proper proportions.

On the other hand, self-inductance L1 is a constant, which is obtained from the leakage inductance Lσ and the inductance ratio Km by an arithmetic operation, using an expression (31), if mutual inductance M is provided.

$$L1 = L\sigma + M \cdot Km \quad (31)$$

Thus, according to the present invention, in addition to the primary resistance, leakage inductance and an inductance ratio, a constant such as self-inductance can be estimated from these constants and a value, such as preset mutual inductance or the like, by an arithmetic operation.

What is claimed is:

1. A control apparatus of an induction motor, comprising:
a detector for detecting a primary current of the induction motor;
primary current component detecting means for detecting an exciting current and a torque current from the current detected by the detector;
correcting means for outputting a correction voltage to set to zero a difference between an exciting current command value and the exciting current outputted from the primary current detecting means;
frequency-voltage control means for outputting a frequency command and a voltage command based on
an output of the correcting means, and
an inductance ratio of the induction motor, the inductance ratio being a ratio of a mutual inductance of the inductance motor to a secondary self-inductance of the induction motor; and
constant correcting means for correcting the inductance ratio used by the frequency-voltage control means to set to zero the output of the correcting means;
wherein the frequency-voltage control means outputs a frequency command and a voltage command based on a constant obtained from
a primary resistance of the induction motor,
the inductance ratio of the induction motor,
a leakage inductance of the induction motor, and
a preset value; and
wherein the constant correcting means corrects the constant.

2. A control apparatus of an induction motor, comprising:
a detector for detecting a primary current of the induction motor;
primary current component detecting means for detecting an exciting current and a torque current from the current detected by the detector;
correcting means for outputting a correction voltage to set to zero a difference between an exciting current command value and the exciting current outputted from the primary current detecting means;
frequency-voltage control means for outputting a frequency command and a voltage command based on
an output of the correcting means,
a primary resistance of the induction motor,
a leakage inductance of the induction motor, and
an inductance ratio of the induction motor, the inductance ratio being a ratio of a mutual inductance of the induction motor to a secondary self-inductance of the induction motor; and
at least one constant correcting means selected from a first constant correcting means, a second constant correcting means, and a third constant correcting means,
the first constant correcting means being for correcting the primary resistance based on a quantity obtained by multiplying a quantity of the voltage command outputted from the frequency-voltage control means by the output of the correcting means, the quantity of the voltage command being a result of partial differentiation with the primary resistance,
the second constant correcting means being for correcting the leakage inductance based on a quantity obtained by multiplying a quantity of the voltage command outputted from the frequency-voltage control means by the output of the correcting means, the quantity of the voltage command being a result of partial differentiation with the leakage inductance, and
the third constant correcting means being for correcting the inductance ratio based on a quantity obtained by multiplying a quantity of the voltage command outputted from the frequency-voltage control means by the output of the correcting means, the quantity of the voltage command being a result of partial differentiation with the inductance ratio.

3. A control apparatus of an induction motor, comprising:
a detector for detecting a primary current of the induction motor;
primary current component detecting means for detecting an exciting current and a torque current from the current detected by the detector;
correcting means for outputting a correction voltage to set to zero a difference between an exciting current command value and the exciting current outputted from the primary current detecting means;
frequency-voltage control means for outputting a frequency command and a voltage command based on
an output of the correcting means,
a primary resistance of the induction motor,
a leakage inductance of the induction motor, and
an inductance ratio of the induction motor, the inductance ratio being a ratio of a mutual inductance of the induction motor to a secondary self-inductance of the induction motor; and at least one constant correcting means selected from a first constant correcting means, a second constant correcting means, and a third constant correcting means, the first constant correcting means being for correcting the primary resistance based on a quantity obtained by multiplying a quantity of the voltage command outputted from the frequency-voltage control means by the output of the correcting means, the quantity of the voltage command being a result of partial differentiation with the primary resistance, the second constant correcting means being for correcting the leakage inductance based on a quantity obtained by multiplying a quantity of the voltage command outputted from the frequency-voltage control means by the output of the correcting means, the quantity of the voltage command being a result of partial differentiation with the leakage inductance, and the third constant correcting means being for correcting the inductance ratio based on a quantity obtained by multiplying a quantity of the voltage command outputted from the frequency-voltage control means by the output of the correcting means, the quantity of the voltage command being a result of partial differentiation with the inductance ratio;

wherein the frequency-voltage control means outputs a frequency command and a voltage command based on a constant obtained by an arithmetic operation from
the primary resistance,
the inductance ratio,
the leakage inductance, and
a preset value; and wherein the second constant correcting means corrects the constant based on a quantity obtained by multiplying a quantity of the voltage command outputted from the frequency-voltage control means by the output of the correcting means, the quantity of the voltage command being a result of partial differentiation with the constant.

4. A control apparatus of an induction motor, comprising:

a detector for detecting a primary current of the induction motor;

primary current component detecting means for detecting an exciting current and a torque current from the current detected by the detector;

correcting means for outputting a correction voltage to set to zero a difference between an exciting current command value and the exciting current outputted from the primary current detecting means;

frequency-voltage control means for outputting a frequency command and a voltage command based on
an output of the correcting means,
a primary resistance of the induction motor,
a leakage inductance of the induction motor, and
a primary self-inductance of the induction motor; and at least one constant correcting means selected from a first constant correcting means, a second constant correcting means, and a third constant correcting means, the first constant correcting means being for correcting the primary resistance based on a quantity obtained by multiplying a quantity of the voltage command outputted from the frequency-voltage control means by the output of the correcting means, the quantity of the voltage command being a result of partial differentiation with the primary resistance, the second constant correcting means being for correcting the leakage inductance based on a quantity obtained by multiplying a quantity of the voltage command outputted from the frequency-voltage control means by the output of the correcting means, the quantity of the voltage command being a result of partial differentiation with the leakage inductance, and the third constant correcting means being for correcting the primary self-inductance based on a quantity obtained by multiplying a quantity of the voltage command outputted from the frequency-voltage control means by the output of the correcting means, the quantity of the voltage command being a result of partial differentiation with the primary self-inductance.

5. A control apparatus of an induction motor, comprising:

a detector for detecting a primary current of the induction motor;

primary current component detecting means for detecting an exciting current and a torque current from the current detected by the detector;

correcting means for outputting a correction voltage to set to zero a difference between an exciting current command value and the exciting current outputted from the primary current detecting means;

frequency-voltage control means for outputting a frequency command and a voltage command based at least on one of
(1) an output of the correcting means, a primary resistance of the induction motor, a leakage inductance of the induction motor, and an inductance ratio of the induction motor, the induction ratio being a ratio of a mutual inductance of the induction motor to a secondary self-inductance of the induction motor, and
(2) a constant replacing at least one of the primary resistance, the leakage inductance, and the inductance ratio, the constant being obtained by a calculation from the primary resistance, the leakage inductance, the inductance ratio, and a preset value; and constant correcting means for correcting the constant for use in the frequency-voltage control means to set to zero the correction voltage output by the correcting means.

* * * * *